(12) United States Patent
Kaviani et al.

(10) Patent No.: US 7,994,838 B2
(45) Date of Patent: *Aug. 9, 2011

(54) CLOCK DISTRIBUTION CIRCUIT

(75) Inventors: Kambiz Kaviani, Palo Alto, CA (US);
Tsu-Ju Chin, Fremont, CA (US)

(73) Assignee: Rambus Inc., Sunnyvale, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/368,984

(22) Filed: Feb. 10, 2009

(65) Prior Publication Data

US 2009/0153215 A1 Jun. 18, 2009

Related U.S. Application Data

(63) Continuation of application No. 11/414,766, filed on Apr. 28, 2006, now Pat. No. 7,489,176.

(51) Int. Cl.
*G06F 1/04* (2006.01)
(52) U.S. Cl. .......................... 327/291; 327/293; 327/295
(58) Field of Classification Search .................. 327/295, 327/291, 293, 298
See application file for complete search history.

(56) References Cited

U.S. PATENT DOCUMENTS

| | | | | |
|---|---|---|---|---|
| 3,654,394 A | 4/1972 | Gordon | ...................... | 179/15 BL |
| 4,165,490 A * | 8/1979 | Howe et al. | .................... | 327/172 |
| 4,390,988 A | 6/1983 | Best et al. | ...................... | 370/113 |
| 5,075,566 A | 12/1991 | Chuang et al. | ................ | 307/243 |
| 5,087,829 A | 2/1992 | Ishibashi et al. | .............. | 307/269 |
| 5,122,679 A | 6/1992 | Ishli et al. | ..................... | 307/269 |
| 5,307,381 A | 4/1994 | Ahuja | ............................. | 375/107 |
| 5,444,407 A | 8/1995 | Ganapathy et al. | ........... | 327/295 |
| 6,028,463 A * | 2/2000 | Albu et al. | ..................... | 327/291 |
| 6,081,145 A | 6/2000 | Bandai et al. | ................. | 327/231 |
| 6,340,905 B1 | 1/2002 | Schultz | .......................... | 327/161 |
| 6,535,038 B2 * | 3/2003 | Hofstra | .......................... | 327/158 |
| 6,653,877 B2 | 11/2003 | Tsujino | .......................... | 327/161 |
| 6,677,792 B2 | 1/2004 | Kwak | ............................. | 327/158 |
| 6,768,361 B2 | 7/2004 | Kwak | ............................. | 327/158 |
| 6,812,777 B2 | 11/2004 | Tamura et al. | ................. | 327/540 |
| 6,907,584 B1 | 6/2005 | Milne et al. | ....................... | 716/1 |
| 6,943,610 B2 | 9/2005 | Saint-Laurent | ............... | 327/295 |
| 7,227,809 B2 * | 6/2007 | Kwak | ...................... | 365/189.15 |

(Continued)

OTHER PUBLICATIONS

Lee, M.E., et al., "Low-Power Area-Efficient High-Speed I/O Circuit Techniques," IEEE J. of Solid-State Circuits, vol. 35, No. 11, Nov. 2000, pp. 1591-1599.

(Continued)

*Primary Examiner* — Hai L Nguyen
(74) *Attorney, Agent, or Firm* — Morgan, Lewis & Bockius LLP

(57) ABSTRACT

A circuit includes a clock generator to provide a clock signal, and a clock distribution circuit coupled to the clock generator and a plurality of pairs of outputs. The clock distribution circuit includes a plurality of adjustment circuits to generate a plurality of pairs of clock signals in accordance with the clock signal. A respective adjustment circuit in the plurality of adjustment circuits is to provide a respective pair of clock signals in the plurality of pairs of clock signals to a respective pair of outputs in the plurality of pairs of outputs. The respective pair of clock signals includes a first clock signal and a second clock signal. The first clock signal is a complement of the second clock signal and duty-cycle and skew errors in the first clock signal and the second clock signal are less than corresponding pre-determined values.

9 Claims, 11 Drawing Sheets

U.S. PATENT DOCUMENTS

| | | | | |
|---|---|---|---|---|
| 7,307,461 | B2 | 12/2007 | Nguyuen et al. | 327/172 |
| 7,489,176 | B2 * | 2/2009 | Kaviani et al. | 327/291 |
| 2004/0150453 | A1 | 8/2004 | Farjad-rad | 327/307 |

OTHER PUBLICATIONS

Van De Beek, R.C.H., et al., "Low-Jitter Clock Multiplication: A Comparison Between PLLs and DLLs," IEE Transactions on Circuits and Systems-II: Analog and Digital Signal Processing, vol. 49, No. 8, Aug. 2002, pp. 555-556.

Wang, Y.M., et al., "A Low-Power Half-Delay-Line Fast Skew-Compensation Circuit," IEEE J. of Solid-State Circuits, vol. 39, No. 6, Jun. 2004, pp. 906-918.

Weinlader, D.K., "Precision CMOS Receivers for VLSI Testing Applications," Doctoral Dissertation, Stanford University, Nov. 2001.

* cited by examiner

CLOCK DISTRIBUTION CIRCUIT

RELATED APPLICATION

This application is a continuation of U.S. Ser. No. 11/414,766, filed Apr. 28, 2006, now U.S. Pat. No. 7,489,176, which is incorporated herein by reference in its entirety.

FIELD

The subject matter disclosed herein relates generally to clock distribution circuits for use in integrated circuits, and in particular, to duty-cycle and skew compensated clock distribution circuits.

BACKGROUND

High-speed interface circuits utilize clock signals to control the timing of data transmission and reception. High data rate communication is often facilitated using complimentary clock signals. Complimentary clock signals allow data to be transmitted and received on rising and falling clock edges. Complimentary clock signals, however, that are generated and/or provided by existing clock distribution circuits may be subject to skew and/or duty-cycle variations. Clock generation and/or distribution circuits also may occupy a large area on the integrated circuit and consume significant amounts of power.

BRIEF DESCRIPTION OF THE DRAWINGS

For a better understanding, reference should be made to the following detailed descriptions taken in conjunction with the accompanying drawings, in which.

Like reference numerals refer to corresponding parts throughout the drawings.

DETAILED DESCRIPTION OF EMBODIMENTS

Figure 1:
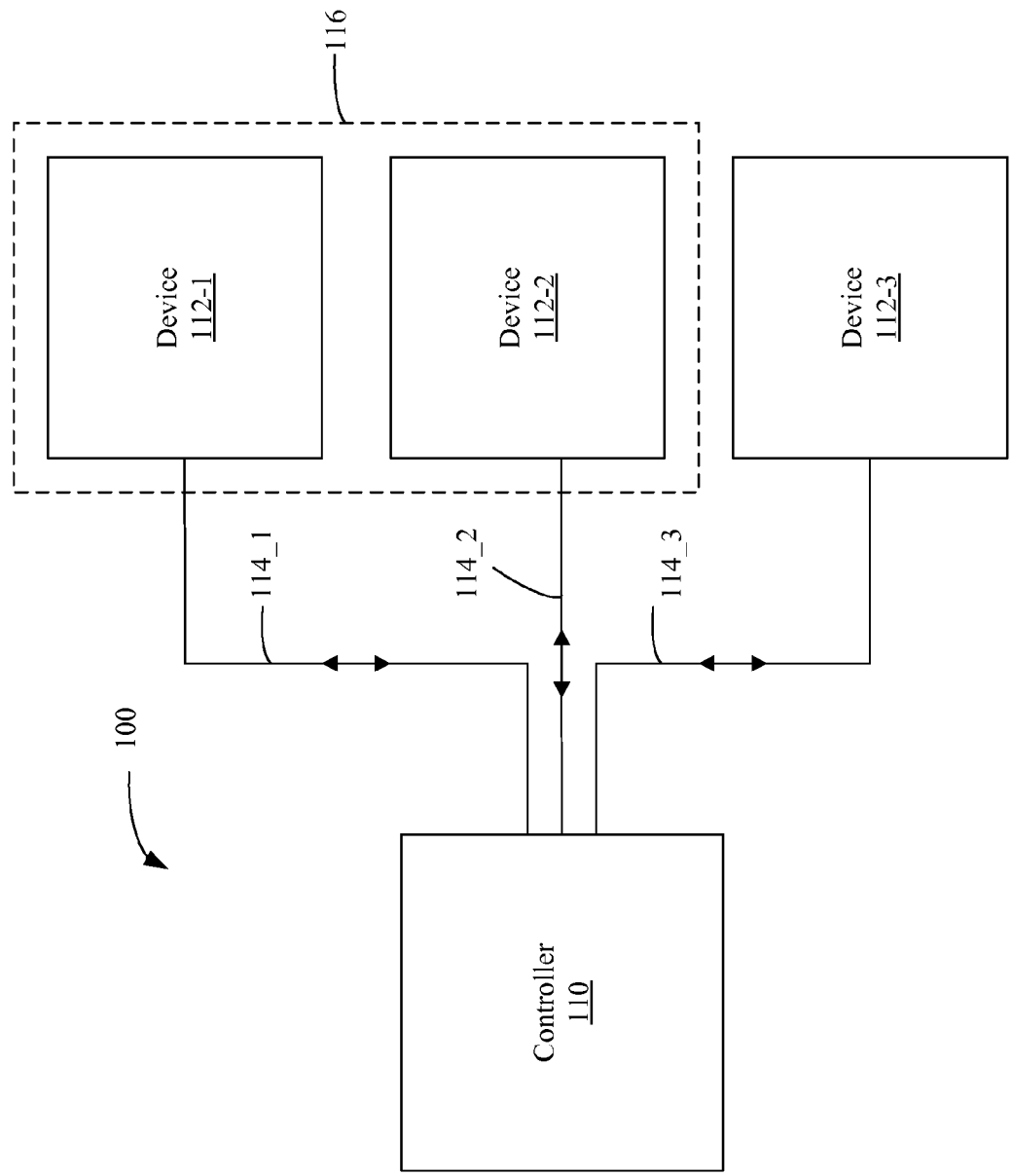
FIG. 1 is a block diagram illustrating an embodiment of a system.

Reference will now be made in detail to embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

Embodiments of circuits for distributing clock signals and methods for using these circuits are described. The circuits generate and/or receive at least one single-ended clock signal. The single-ended clock signal is coupled to a clock distribution circuit. The clock distribution circuit includes a plurality of adjustment circuits for providing a plurality of pairs of clock signals in accordance with the single-ended clock signal. The plurality of adjustment circuits adjust, reduce and/or eliminate skew errors and/or duty-cycle errors between the clock signals in at least one of the plurality of pairs of clock signals. In some embodiments, the clock signals in each of the pairs of clock signals are complementary, i.e., having a phase difference with respect to one another that is approximately 180°.

The duty-cycle error may correspond to a non-zero time average of at least one of the clock signals in one or more of the pairs of clock signals. The skew error may correspond to a phase difference other than 180° between the clock signals in one or more of the pairs of clock signals.

Adjustment, reduction and/or elimination of skew-errors and/or duty-cycle errors in one or more of the pairs of clock signals may be in accordance with an eye pattern and/or an error rate associated with a communication channel between integrated circuits.

The circuit may include control logic for determining at least one register value that determines and/or corresponds to an adjustment that reduces and/or eliminates skew-errors and/or duty-cycle errors in one or more of the pairs of clock signals. The adjustment may be coarse, i.e., greater than a pre-determined value, or fine, i.e., less than a pre-determined value. In some embodiments, the circuit includes a plurality of output drivers that are each coupled to a corresponding pair of clock signals in the plurality of pairs of clock signals. The plurality of adjustment circuits may be proximate to the plurality of output signal drivers.

The circuits may be included in one or more integrated circuits, such as one or more memory controllers and/or one or more memory devices. The one or more memory devices may be embedded in one or more memory modules. The one or more memory controllers and the one or more memory devices may be on a common or same circuit board. The one or more memory devices may include at least one memory core that utilizes solid-state memory, semiconductor memory, organic memory and/or another memory material.

Attention is now directed towards circuits, devices and systems that include clock distribution circuits. FIG. 1 is a block diagram illustrating an embodiment of a system 100. The system 100 includes at least one controller 110 and one or more devices 112. In some embodiments, the controller 110 is a memory controller and the one or more devices 112 are memory devices. The one or more memory devices may include dynamic random access memory (DRAM), static random access memory (SRAM), synchronous dynamic random access memory (SDRAM) such as DDR or XDR memory, and/or electrically erasable programmable read-only memory (EEPROM). Furthermore, while in some embodiments the controller 110 and devices 112 may be separate integrated circuits, in another embodiment the controller 110 and devices 112 are integrated in a single system-on-a-chip (SOC).

While FIG. 1 illustrates the system 100 having one controller 110 and three devices 112, other embodiments may have additional controllers and fewer or more devices 112. Also, while the system 100 illustrates the controller 110 coupled to multiple devices 112, in other embodiments two or more controllers may be coupled to one another. The controller 110 and/or one or more of the devices 112 may include one or more clock distribution circuits, as discussed further below in FIGS. 2A and 2B. In embodiments where the devices 112 are memory devices, two or more of the devices, such as devices 112-1 and 112-2, may be configured as a memory bank 116.

The controller 110 and the devices 112 are connected by one or more links 114. While the system 100 illustrates three links 114, other embodiments may have fewer or more links 114. The links 114 may be used for bi-directional and/or uni-directional communications between the controller 110 and one or more of the devices 112. Bi-directional communication may be simultaneous in some embodiments, and not simultaneous in other embodiments. In some embodiments, one or more of the links 114 and corresponding transmitters (not shown) and/or receivers (not shown) may be dynamically configured, for example, by control logic (not shown), for bi-directional and/or unidirectional communication.

Data may be communicated on one or more of the links 114 using one or more sub-channels, such as a baseband sub-channel corresponding to a first frequency band and/or a passband sub-channel corresponding to a second frequency band. In some embodiments, such as those where at least one of the links 114 is ac-coupled, the baseband sub-channel may not contain DC (i.e., does not include 0 Hz). In some embodiments, the first frequency band and the second frequency band may be orthogonal. In other embodiments there may be substantial overlap of one or more neighboring pairs of frequency bands. A respective sub-channel may also correspond to a group of frequency bands.

Figure 2A:
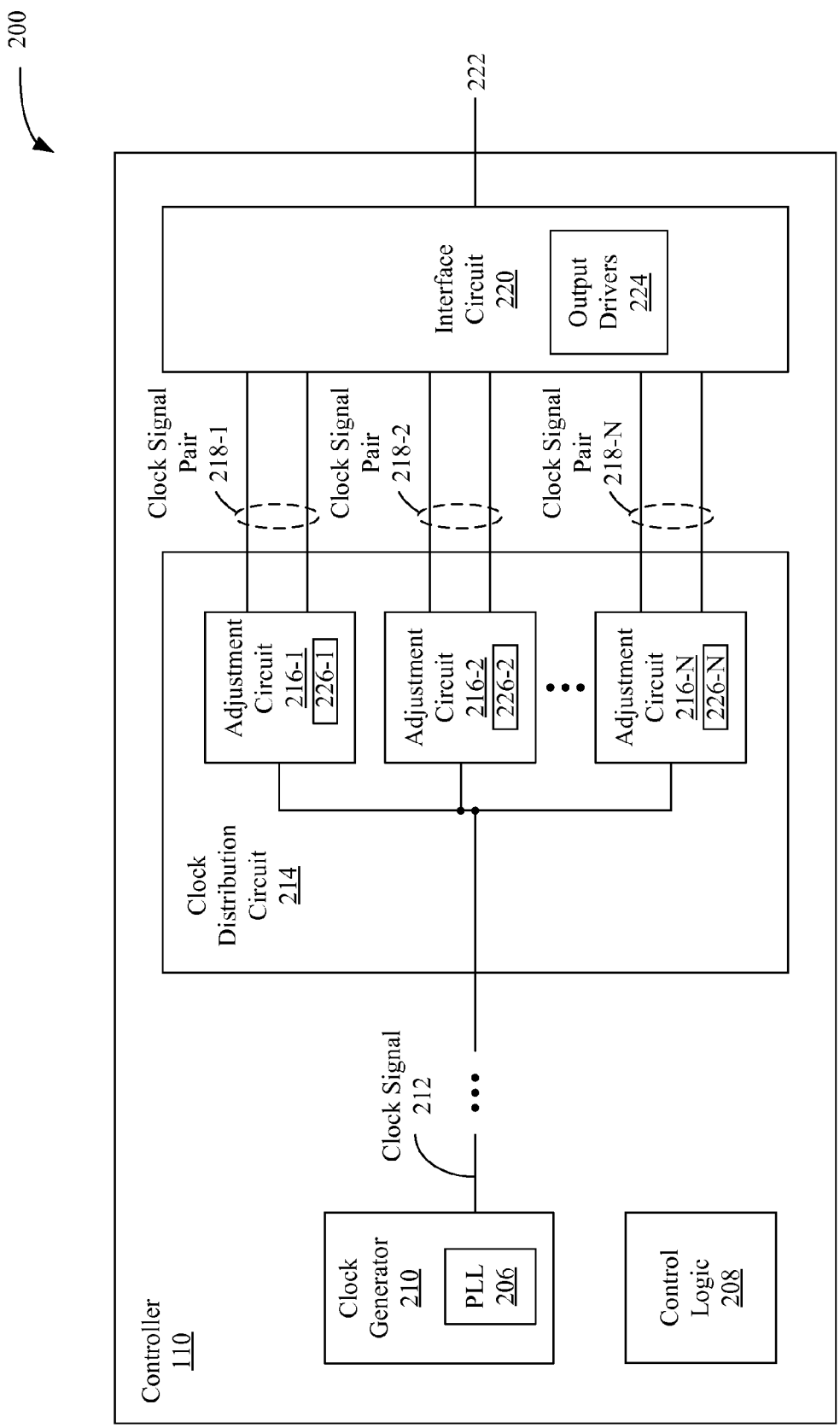
FIG. 2A is a block diagram illustrating an embodiment of a controller.

FIG. 2A is a block diagram illustrating an embodiment 200 of a controller 110, such as a memory controller. The controller 110 includes a clock generator 210 for generating at least a clock signal 212. The clock generator 210 may include a delay-locked loop and/or a phase locked loop 206. The clock signal 212 may be single-ended. In some embodiments, the clock signal 212 may be differential. The clock signal 212 may be coupled to a plurality of adjustment circuits 216 in clock distribution circuit 214. The use of a single-ended clock signal 212 eliminates skew errors in the clock signal 212, even when the clock signal 212 is a significant distance away from the clock distribution circuit 214 and/or when the clock signal 212 is coupled to the adjustment circuits 216 using interconnects having different lengths.

The adjustment circuits 216 each provide clock signal pairs 218 in accordance with the clock signal 212. The clock signals in each of the clock signal pairs 218 may be complementary. As described further below, with reference to FIGS. 4-7, one or more of the adjustment circuits 216 may adjust one or more of the corresponding clock signal pairs 218 to reduce and/or eliminate skew errors and/or duty-cycle errors in the corresponding clock signal pairs. The adjustment may include a coarse adjustment and/or a fine adjustment. These adjustments may reduce the skew errors and/or the duty-cycle errors such that the remaining skew errors and/or duty-cycle errors fall below a pre-determined value, such as +/−1.5%.

The clock signal pairs 218 may be coupled to an interface circuit 220. In some embodiments, the clock distribution circuit 214 may be in close proximity, i.e., adjacent or near to, the interface circuit 220 and/or link 222. The interface circuit 220 may include a plurality of output drivers 224, each of which may be coupled to a corresponding clock signal pair in the clock signal pairs 218. The interface circuit 220 may transmit and/or receive signals on an interconnect or link 222 in accordance with the clock signal pairs 218. The link 222 may include a data and/or command bus. The link 222 may be coupled to one or more addition integrated circuits, as illustrated in FIG. 1. The combination of the interface circuit 220, the link 222 and interface circuits in the one or more additional integrated circuits may constitute a communications channel.

The controller 110 may include control logic 208. The control logic 208 may determine one or more values that are stored in one or more registers 226. The one or more registers 226 may be in (as shown in FIG. 2A) and/or proximate to the adjustment circuits 216. The one or more values may determine the adjustment by the adjustment circuits 216 for skew errors and/or duty-cycle errors in one or more of the clock signal pairs 218.

The one or more values may be determined during a calibration procedure or during normal operation of the controller 110. The control logic 208 may be included in a feedback loop. In some embodiments, the feedback loop may include the clock signal pairs 218 and the adjustment circuits 216. In some embodiments, the feedback loop may include the clock signal pairs 218 and the clock generator 210. The feedback loop may be used to measure skew errors and/or duty-cycle errors in one or more of the clock signal pairs 218 and modify the one or more values accordingly. The one or more values may be adjusted and/or modified after at least a pre-determined time interval since a previous adjustment, for example, 5 ms. In other embodiments, the one or more values may be adjusted and/or modified continuously and/or during each clock cycle. In other embodiments, the one or more values may be set once or may be static.

Figure 3A:
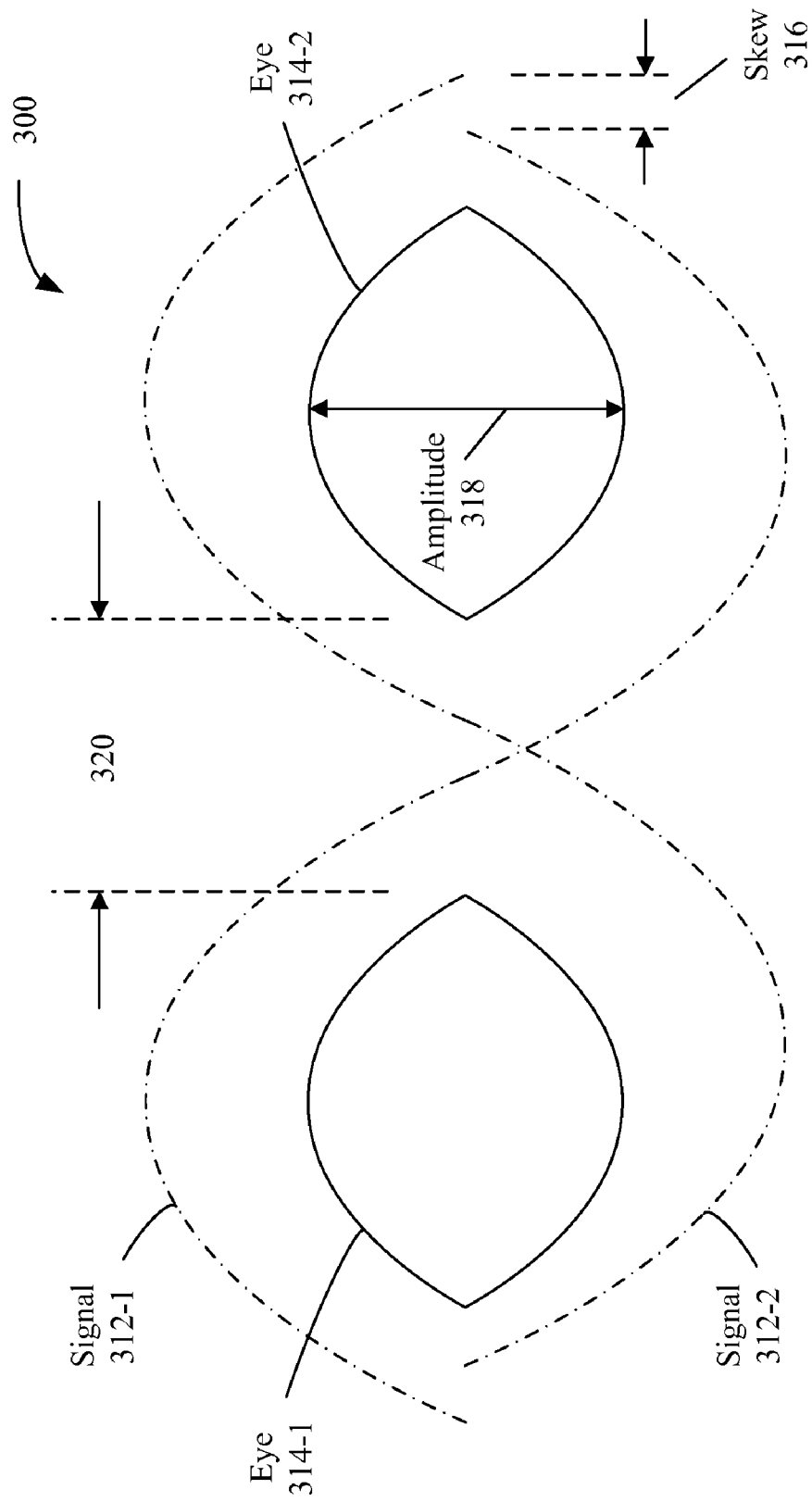
FIG. 3A is a schematic illustration of an eye pattern.

As discussed further below with reference to FIGS. 3A and 3B, the one or more values may be determined in accordance with an eye pattern and/or with an error rate over the communications channel. The eye pattern may be determined based on pass or fail, i.e., acceptable or unacceptable, error rates on one or more signal lines in the link 222. In some embodiments, an adjustment for a duty-cycle error in at least one clock signal in a respective clock signal pair, such as clock signal pair 218-1, may be determined in accordance with an asymmetry, if any, between a first opening and a second opening in an eye pattern. In some embodiments, an adjustment for a skew error between clock signals in the respective clock signal pair, such as the clock signal pair 218-1, may be determined in accordance with amplitudes of the first opening and the second opening.

In this way, the clock signals 218 may be adjusted to reduce and/or eliminate skew errors and/or duty-cycle errors associated with power, voltage, temperature, process variations, mismatches, component errors and/or interface signal path lengths. The adjustments may be performed in close proximity to the interface circuit 220, thereby reducing any residual skew errors and/or duty-cycle errors. This approach to clock distribution may also offer reduced power consumption. In addition, this approach to clock distribution allows skew errors and/or duty-cycle errors to be reduced and/or eliminated on a pin-by-pin basis, i.e., on individual pins, in the interface circuit 220. Some or all of which may allow the controller 110 to transmit and receive information using the link 222 at high data rates with error rates lower than a pre-determined value, such as $10^{-15}$.

In some embodiments, the embodiment 200 may include fewer or additional components. For example, there may be fewer or additional adjustment circuits 216. The logical positions of one or more components may be changed. Two or more components may be combined into a single component. Some of the components may be shared by additional components.

Figure 2B:
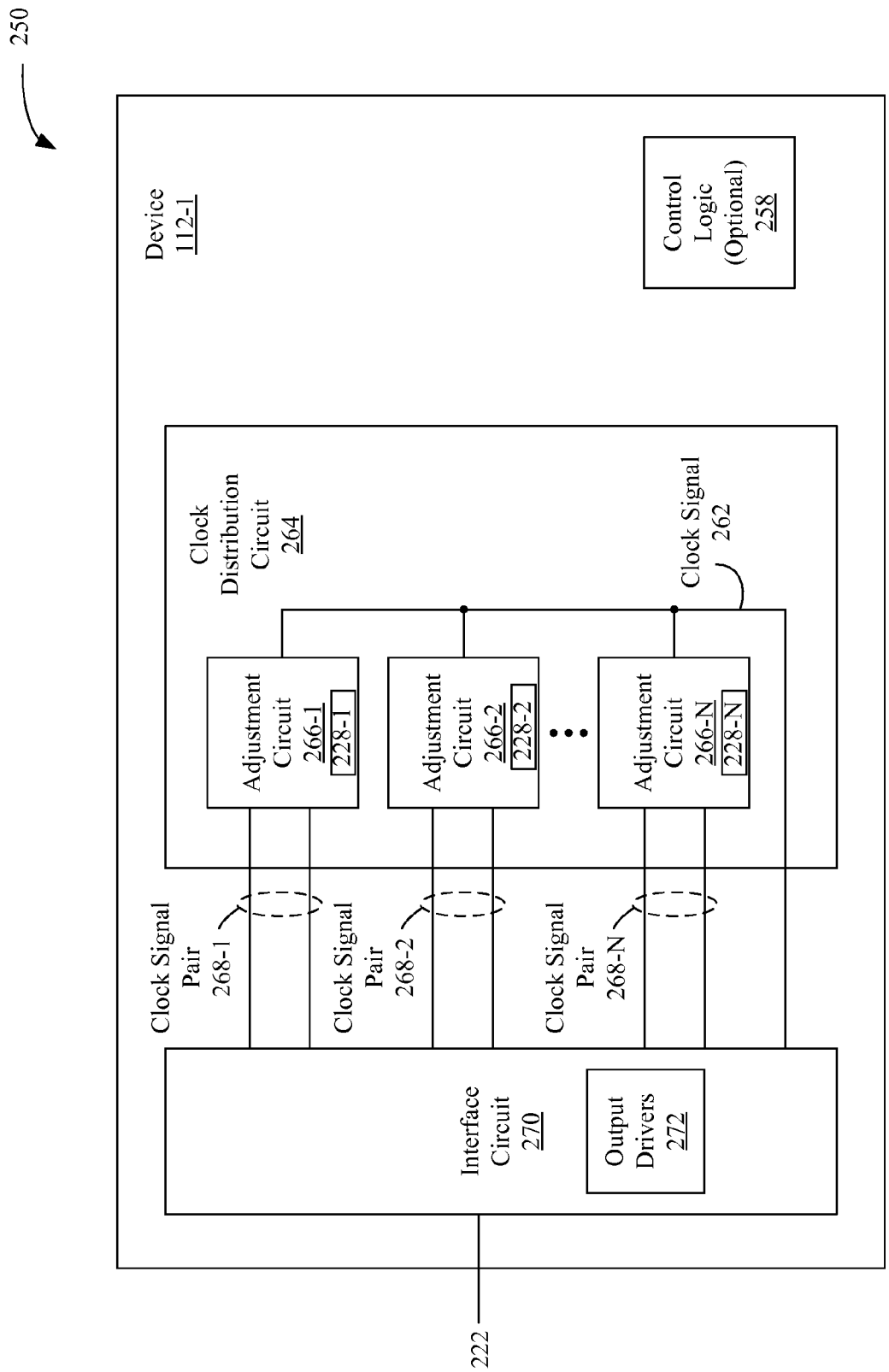
FIG. 2B is a block diagram illustrating an embodiment of a device.

FIG. 2B is a block diagram illustrating an embodiment 250 of a device, such as device 112-1. The device 112-1 may be a memory device. An interface circuit 270 may be coupled to the link 222. At least a clock signal 262 may be received on the link 222 and/or may be recovered from data or information transmitted on the link 222. The clock signal 262 may be single-ended. In some embodiments, the clock signal 262 is differential. The clock signal 262 may be coupled to clock distribution circuit 264. The clock distribution circuit may include a plurality of adjustment circuits 266. The adjustment circuits 266 may provide clock signal pairs 268 to the interface circuit 270. The interface circuit 270 may optionally include a plurality of corresponding output drivers 272. The interface circuit 270 may transmit and/or receive signals on the link 222.

The clock signal pairs 268 may have properties such as those of the clock signal pairs 218 (FIG. 2A). The adjustment circuits 266 may perform functions such as those of the adjustment circuits 216 (FIG. 2A). In some embodiments, the control logic 208 (FIG. 2A) may adjust and/or modify one or more values in one or more registers 228 in the device 112-1 using one or more of the approaches described previously for the controller 110 (FIG. 2A). The one or more registers 228 may be in (as shown in FIG. 2B) and/or proximate to the adjustment circuits 266. The one or more values may determine the adjustment by the adjustment circuits 266 for skew errors and/or duty-cycle errors in one or more of the clock signal pairs 268. In some embodiments, the device 112-1 may include optional control logic 258. The optional control logic 258 may perform the function of the control logic 208 (FIG. 2A) in adjusting and/or modifying the one or more values in the device 112-1.

In some embodiments, the embodiment 250 may include fewer or additional components. The logical positions of one or more components may be changed. Two or more components may be combined into a single component. Some of the components may be shared by additional components.

In some embodiments, systems, such as the system 100 (FIG. 1), may include one or more controllers, such as the controller 110 (FIG. 2A), and one or more devices, such as the device 112-1, that include the clock distribution circuits 214 (FIG. 2A) and 264. The one or more controllers may include control logic, such as the control logic 208 (FIG. 2A), and/or the one or more devices may include control logic, such as the control logic 258.

The control logic 208 (FIG. 2A) and/or the control logic 258 may be incorporated in one or more feedback loops. The one or more feedback loops may be used to measure skew errors and/or duty-cycle errors in one or more clock signal pairs, such as the clock signal pairs 218 (FIG. 2A) and/or the clock signal pairs 268. The control logic 208 (FIG. 2A) and/or the control logic 258 may adjust or modify one or more values in one or more registers accordingly to reduce and/or eliminate skew errors and/or duty-cycle errors in one or more clock signal pairs, such as the clock signal pairs 218 (FIG. 2A) and/or the clock signal pairs 268. The one or more registers may be in and/or proximate to the adjustment circuits 216 (FIG. 2A) and/or the adjustment circuits 266. In some embodiments, the control logic 208 is used to adjust and/or modify the one or more values in the one or more controllers and/or in the one or more devices.

The one or more values may be determined during a calibration procedure or during normal operation of the system. The one or more values may be adjusted and/or modified after at least a pre-determined time interval since a previous adjustment, for example, 5 ms. In other embodiments, the one or more values may be adjusted and/or modified continuously and/or during each clock cycle. In other embodiments, the one or more values may be set once or may be static.

Attention is now directed towards embodiments of eye patterns that may be used by control logic, such as the control logic 208 (FIG. 2A) and/or the control logic 258, to adjust and/or modify the one or more values, which in turn, may be used in the adjustment circuit 216 (FIG. 2A) and/or the adjustment circuit 266 to reduce and/or eliminate skew errors and/or duty-cycle errors in one or more of the clock signal pairs 218 (FIG. 2A) and/or the clock signal pairs 268. FIG. 3A is a schematic illustration of an eye pattern 300. Eye patterns, such as the eye pattern 300, may be determined by varying a phase between one or more clock signals, such one or more of the clock signal pairs 218 (FIG. 2A) and/or the clock signal pairs 268 (FIG. 2B), and signals 312. In some embodiments, the phase may be varied globally at the clock generator 210 (FIG. 2A). The eye pattern 300 may be defined using those phases that result in a passing error rate, i.e., an error rate that is less than a pre-determined value.

In the eye pattern 300, a skew 316 between signal 312-1 and signal 312-2 results in eye 314 openings having an amplitude 318. The amplitude 318 corresponds to the maximum superposition of the signals 312. In some embodiments, the eye pattern 300 may correspond to error rates less than a pre-determined value, i.e., passing or acceptable error rates. The amplitude 318 in such embodiments may, therefore, be interpreted as a signal margin. The presence of the skew 316 reduces the amplitude 318 and also results in a temporal spacing 320 between the eyes 314. The skew 316 may, therefore, be determined using the amplitude 318 and/or the temporal spacing 320 between the eyes 314. The corresponding one or more values may be used by the adjustment circuits 216 (FIG. 2A) and/or the adjustment circuits 266 (FIG. 2B) to reduce and/or eliminate the skew 316 by maximizing the amplitude 318 and/or minimizing the temporal spacing 320 between the eyes 314.

Figure 3B:
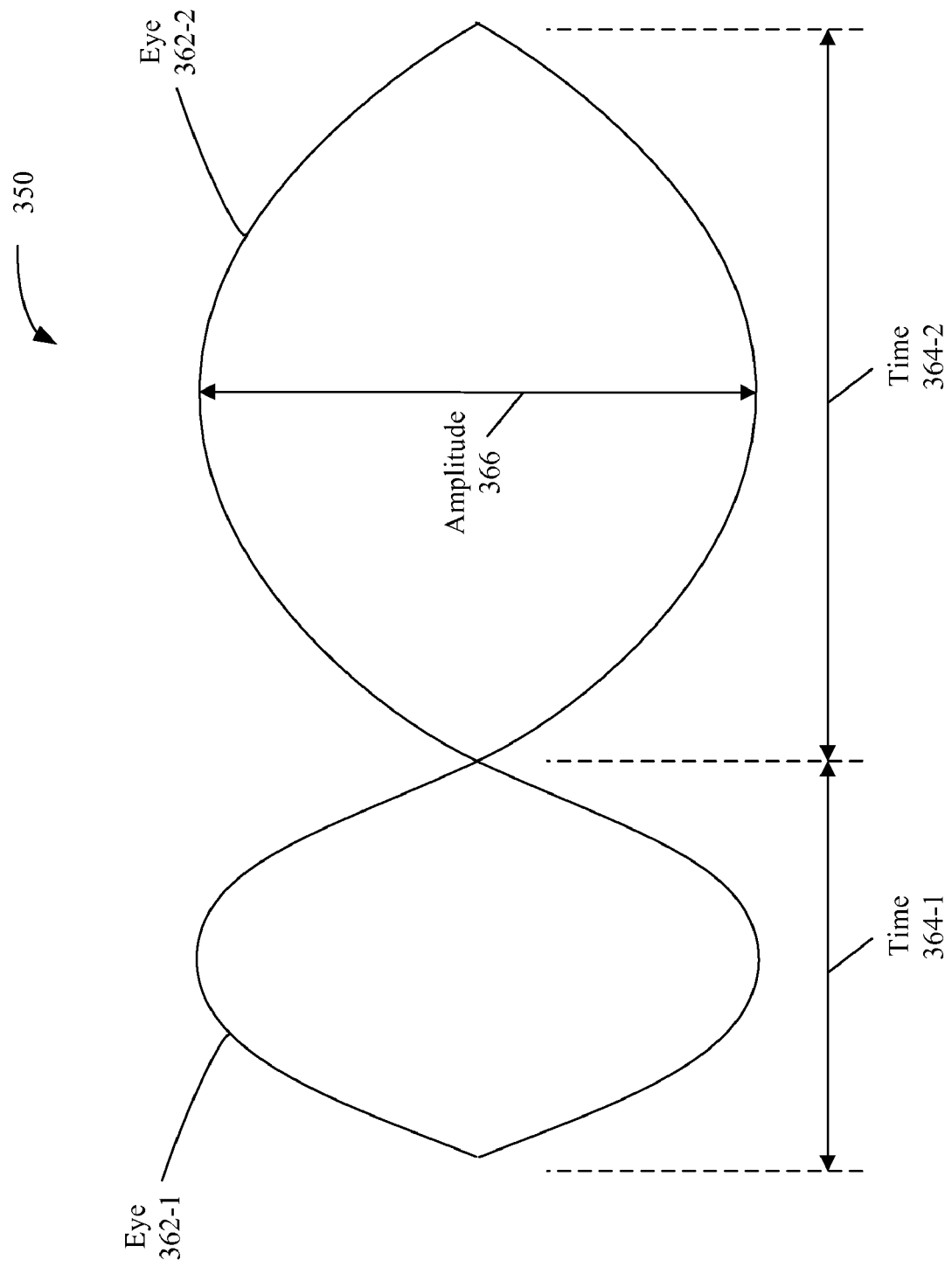
FIG. 3B is a schematic illustration of an eye pattern.

FIG. 3B is a schematic illustration of an eye pattern 350. In the eye pattern 350, the skew is zero, as evidenced by amplitude 366, which is larger than the amplitude 318 (FIG. 3A). As a consequence, the signals are superimposed with eye 362 openings. In the eye pattern 350, there is a duty-cycle error in the signals. This is evidenced by time 364 asymmetry in the eyes 362. The duty-cycle error may be defined as $$\left| \frac{t_1 - t_2}{2(t_1 + t_2)} \right|,$$

where $t_1$ is time 364-1 and $t_2$ is time 364-2. Thus, the duty-cycle error may also be determined using an eye pattern, such as the eye pattern 350. The corresponding one or more values may be used by the adjustment circuits 216 (FIG. 2A) and/or the adjustment circuits 266 (FIG. 2B) to reduce and/or eliminate the duty-cycle error by reducing and/or eliminating the time 364 asymmetry.

In the general case, a respective eye pattern (corresponding to one of the clock signal pairs 218 in FIG. 2A and/or the clock signal pairs 268 in FIG. 2B) may include both skew errors and duty-cycle errors. The respective eye pattern may be used to determine the one or more values that are used by the adjustment circuits 216 (FIG. 2A) and/or the adjustment circuits 266 (FIG. 2B) to reduce and/or eliminate the determined skew errors and/or duty-cycle errors.

Figure 4:
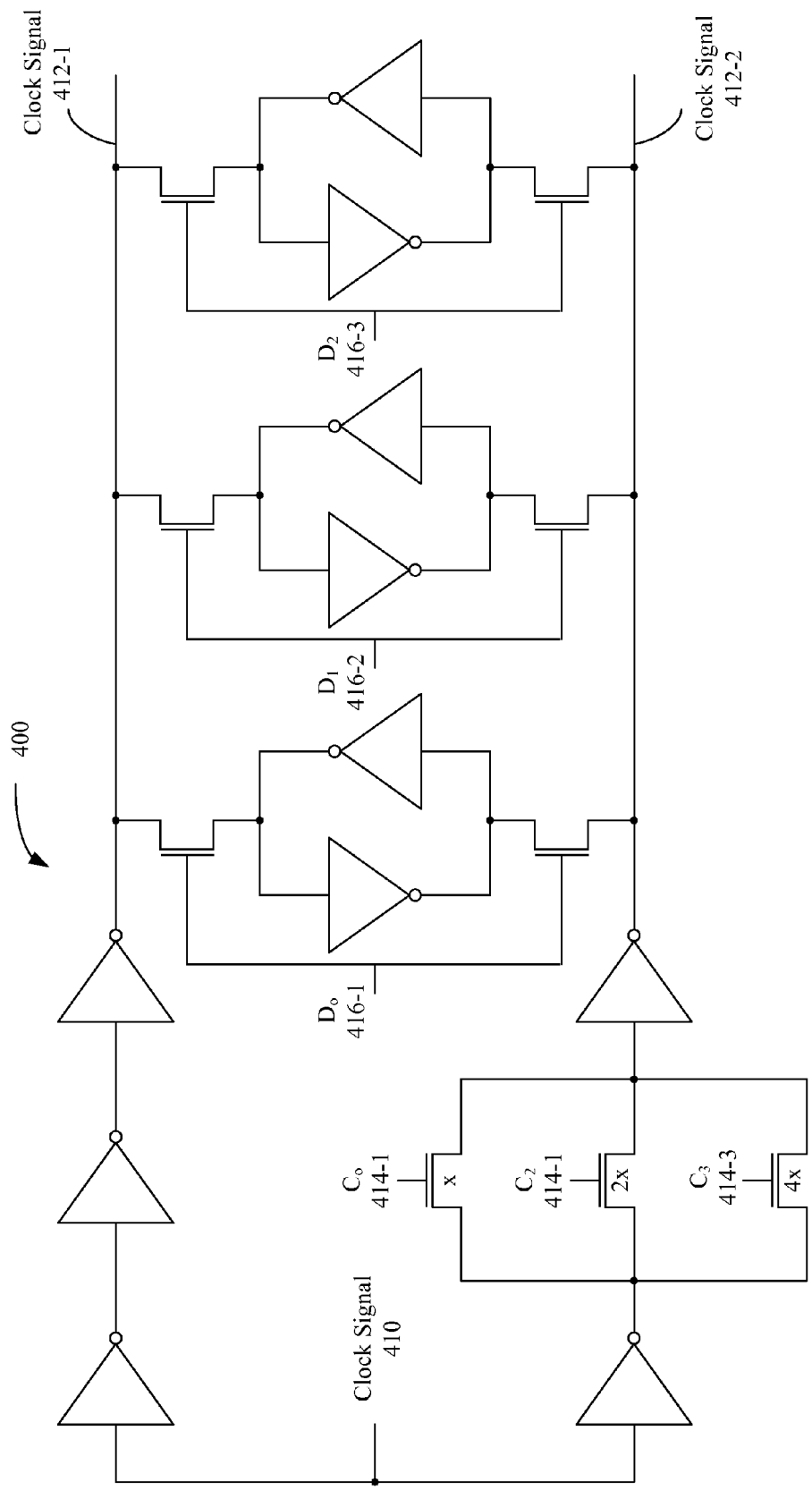
FIG. 4 is a block diagram illustrating an embodiment of a clock distribution circuit.

Attention is now directed towards embodiments of adjustment circuits, such as the adjustment circuits 216 (FIG. 2A) and/or the adjustment circuits 266 (FIG. 2B). FIG. 4 is a block diagram illustrating an embodiment of a clock distribution circuit 400. A clock signal 410 is used to provide clock signals 412 using inverter circuits in conjunction with skew error and/or duty-cycle error adjustment. An odd number of sequentially positioned inverters in one arm and an even number of sequentially positioned inverters in another arm of the clock distribution circuit 400 results in clock signals 412 that are complementary. Weighted transistors, such as binary weighted transistors, are controlled by values $C_i$ 414 to reduce and/or eliminate skew errors. Values $D_i$ 416 control weighted transistors, which may be binary weighted. These transistors, in turn, gate an amount of current that flows in either of the back-to-back inverters coupling the clock signals 412. In this way, skew and/or duty-cycle errors may be reduced and/or eliminated. The weighted transistors in the clock distribution circuit 400 allow a range of values $C_i$ 414 and/or $D_i$ 416 corresponding to coarse and/or fine adjustment or modification.

The clock distribution circuit 400 may include fewer or additional components. The positions of one or more components may be changed. Two or more components may be combined into a single component. Some of the components may be shared by additional components.

Figure 5:
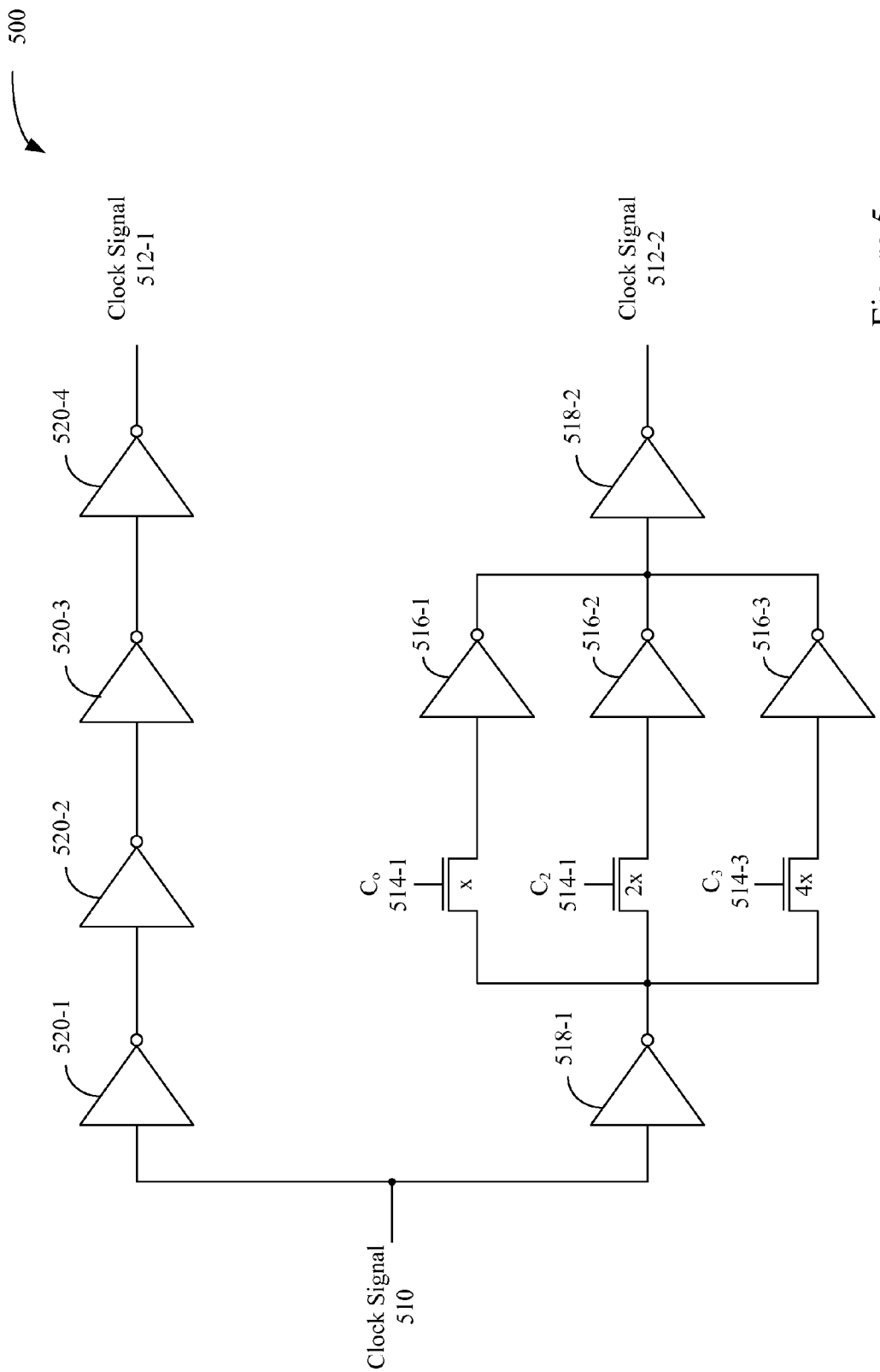
FIG. 5 is a block diagram illustrating an embodiment of a clock distribution circuit.

FIG. 5 is a block diagram illustrating an embodiment of a clock distribution circuit 500. A clock signal 510 is used to provide clock signals 512 using inverter circuits in conjunction with a skew error adjustment. An odd number of sequentially positioned inverters 516 and 518 in one arm and an even number of sequentially positioned inverters 520 in another arm of the clock distribution circuit 500 results in clock signals 512 that are complementary. Weighted transistors, such as binary weighted transistors, are controlled by values $C_i$ 514 to reduce and/or eliminate skew errors. In general, skew errors may be reduced or eliminated by providing a delay in at least one of the arms of the clock distribution circuit 500. In some embodiments, the delay may be variable. The inverters 516 are included in series with the weighted transistors in the clock distribution circuit 500. These inverters 516 may provided additional weighted amplification to reduce and/or eliminate duty-cycle errors. In some embodiments, the addition weighting may be binary.

The clock distribution circuit 500 may include fewer or additional components. For example, the number of inverters 516, 518 and 520 may vary from one embodiment to another. The positions of one or more components may be changed. Two or more components may be combined into a single component. Some of the components may be shared by additional components.

Figure 6:
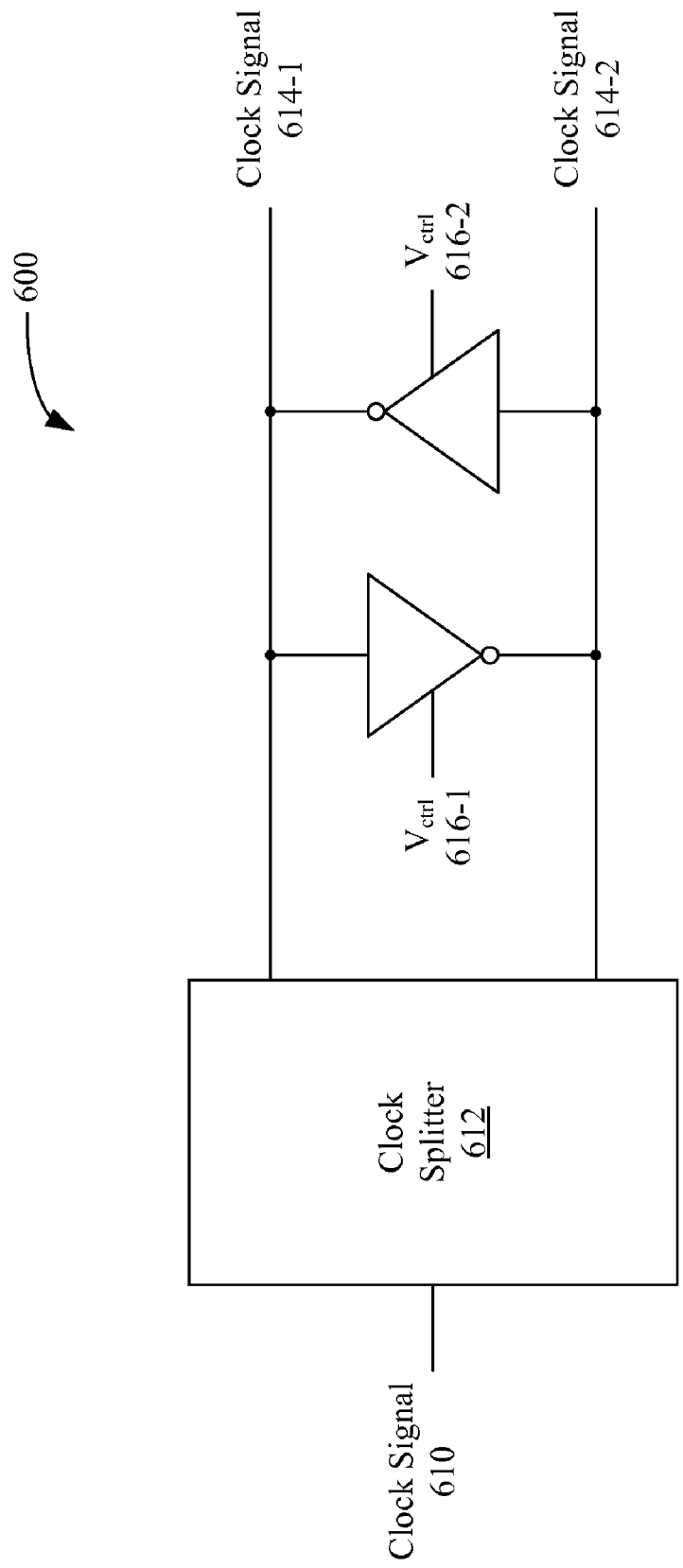
FIG. 6 is a block diagram illustrating an embodiment of a clock distribution circuit.

FIG. 6 is a block diagram illustrating an embodiment of a clock distribution circuit 600. A clock signal 610 is coupled to a clock splitter 612. The clock splitter 612 provides clock signals 614. The clock signals 614 may be complementary. Inverters are controlled by values $V_{ctrl}$ 616 to reduced and/or eliminate skew errors between the clock signals 614.

The clock distribution circuit 600 may include fewer or additional components. The positions of one or more components may be changed. Two or more components may be combined into a single component. Some of the components may be shared by additional components.

Figure 7:
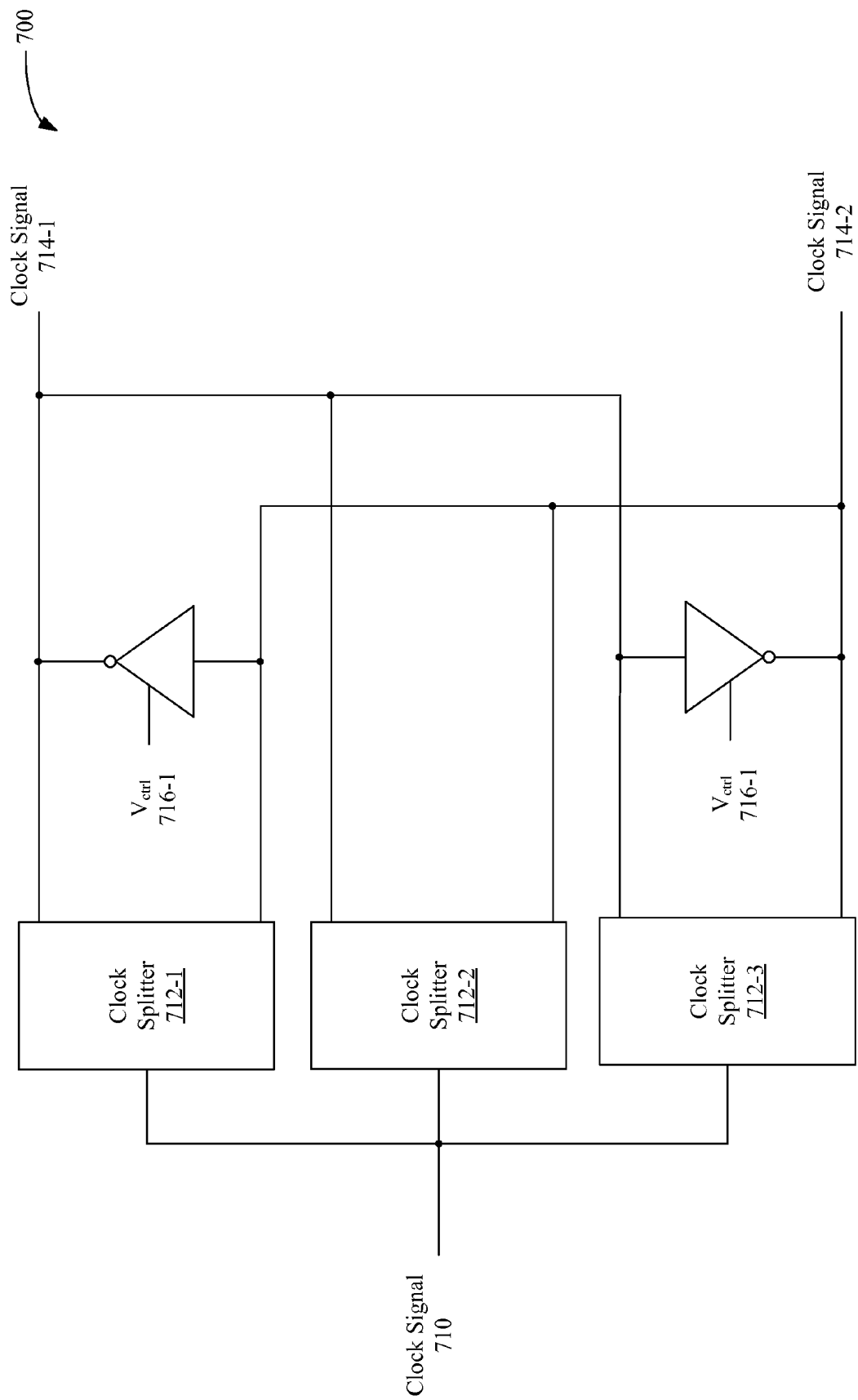
FIG. 7 is a block diagram illustrating an embodiment of a clock distribution circuit.

FIG. 7 is a block diagram illustrating an embodiment of a clock distribution circuit 700. A clock signal 710 is coupled to clock splitters 712 that provide clock signals 714. The clock signals 714 may be complementary. Inverters are controlled by values $V_{ctrl}$ 716 to reduced and/or eliminate skew errors between the clock signals 714.

The clock distribution circuit 700 may include fewer or additional components. The positions of one or more components may be changed. Two or more components may be combined into a single component. Some of the components may be shared by additional components.

Figure 8:
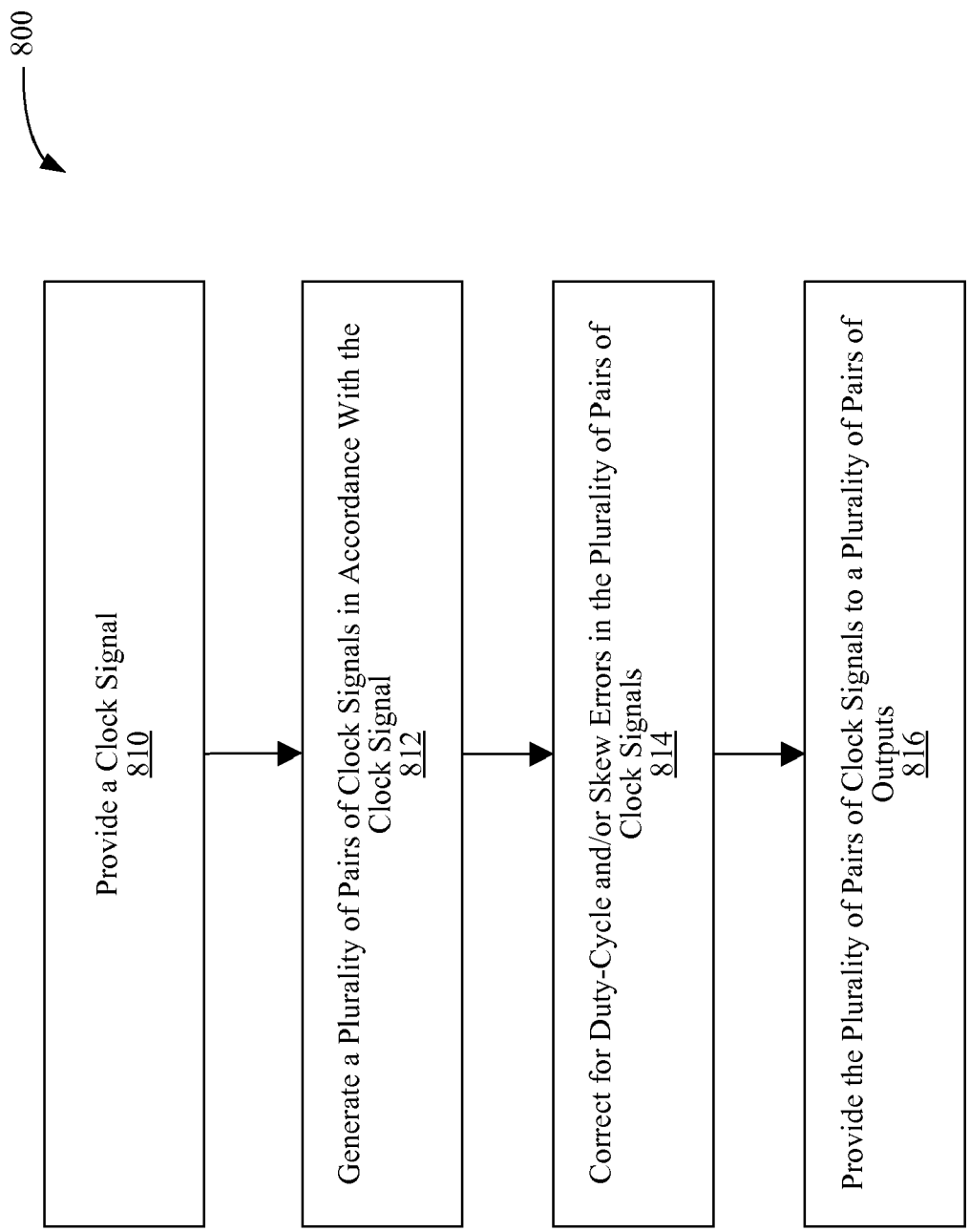
FIG. 8 is a flow diagram illustrating an embodiment of a method of operation of a clock distribution circuit.

FIG. 8 is a flow diagram illustrating an embodiment 800 of a method of operation of a clock distribution circuit. While the embodiment 800 described below includes a number of operations that appear to occur in a specific order, it should be apparent that the method can include more or fewer operations, which can be executed serially or simultaneously or during overlapping time periods (e.g., circuits that operate simultaneously or during overlapping time periods).

A clock signal is provided 810 to a device, such as a memory controller. A plurality of pairs of clock signals are generated and/or provided in accordance with the clock signal 812, and duty-cycle and/or skew errors are corrected in the pairs of clock signals 814. The correction may be performed on individual clock signals in the plurality of pairs of clock signals. The resulting pairs of clock signals are provided to a plurality of pairs of outputs 816.

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

Figure 9:
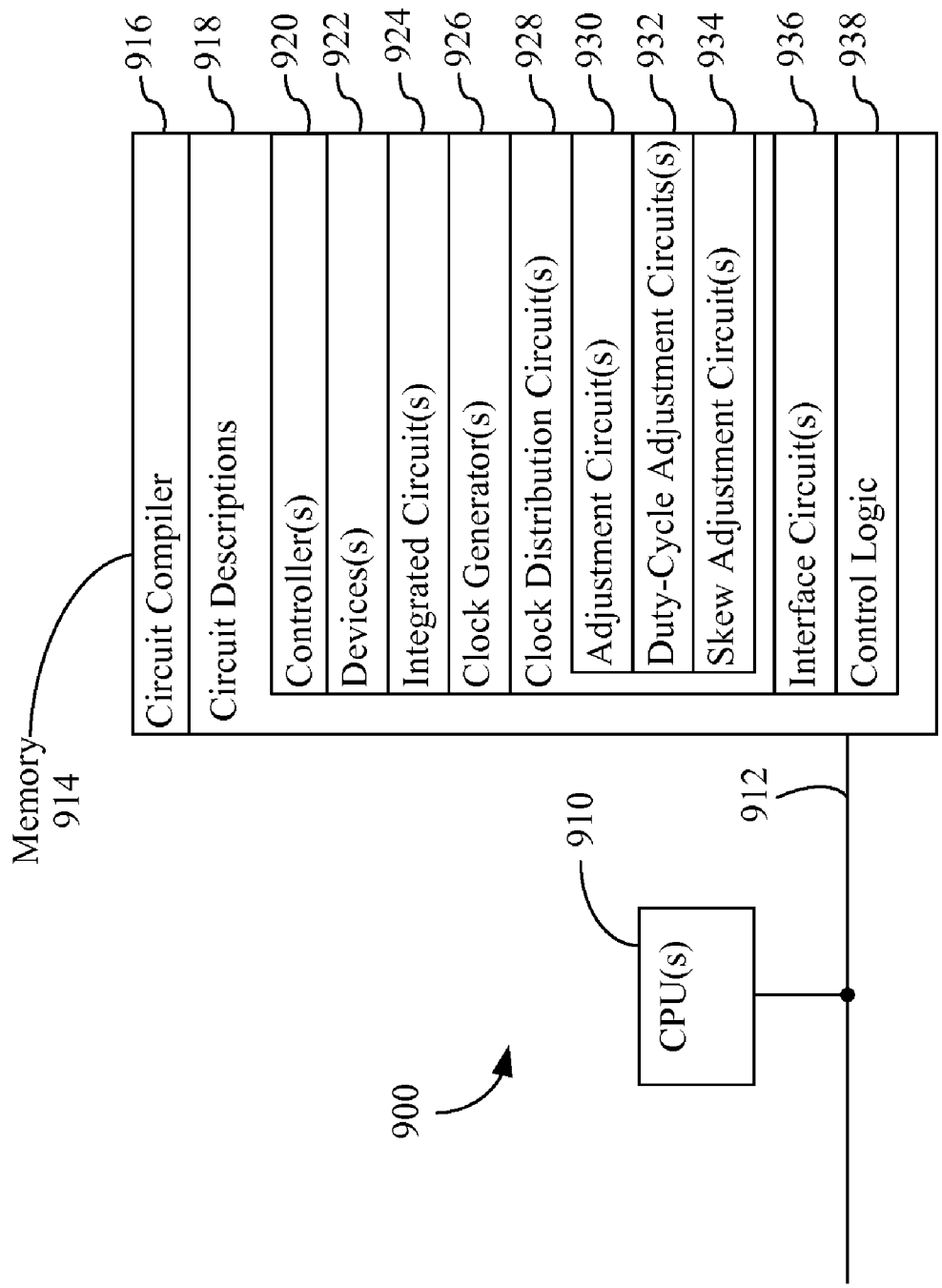
FIG. 9 is a block diagram illustrating an embodiment of a system.

FIG. 9 is a block diagram an embodiment of a system 900 for storing computer readable files containing software descriptions of the circuits. The system 900 may include at least one data processor or central processing unit (CPU) 910, memory 914 and one or more signal lines or communication busses 912 for coupling these components to one another. Memory 914 may include high-speed random access memory and/or non-volatile memory, such as one or more magnetic disk storage devices. Memory 914 may store a circuit compiler 916 and circuit descriptions 918. Circuit descriptions 918 may include circuit descriptions for one or more controllers 920, one or more devices 922, one or more integrated circuits 924, one or more clock generators 926, one or more clock distribution circuits 928, one or more interface circuits 936 and/or control logic 938. The one or more clock distribution circuits 928 may include one or more adjustment circuits 930, one or more duty-cycle adjustment circuits 932 and/or one or more skew adjustment circuits 934.

A first integrated circuit is described above. The first integrated circuit includes a clock generator to provide a clock signal, and a first clock distribution circuit coupled to the clock generator and a first plurality of pairs of outputs. The first clock distribution circuit includes a first plurality of adjustment circuits to generate a first plurality of pairs of clock signals in accordance with the clock signal. A respective adjustment circuit in the first plurality of adjustment circuits provides a respective pair of clock signals in the first plurality of pairs of clock signals to a respective pair of outputs in the first plurality of pairs of outputs. The respective pair of clock signals includes a first clock signal and a second clock signal. The first clock signal is a complement of the second clock signal and duty-cycle and skew errors in the first clock signal and the second clock signal are less than corresponding pre-determined values.

The respective adjustment circuit may include at least one register to store at least one value that corresponds to adjustments for duty-cycle and/or skew errors in the first clock signal and the second clock signal. The respective adjustment circuit may include a coarse skew and/or duty-cycle adjustment circuit(s) to reduce skew and/or duty-cycle errors greater than a first pre-determined value and a fine skew and/or duty-cycle adjustment circuit(s) to reduce skew and/or duty-cycle errors less than the first pre-determined value. The register(s) may store a coarse skew and/or duty-cycle adjustment value coupled to the coarse skew and/or duty-cycle adjustment circuit(s) and/or a fine skew and/or duty-cycle adjustment value coupled to the fine skew and/or duty-cycle adjustment circuit(s). The clock generator may include a phase-locked loop.

The duty-cycle error may correspond to a time average of the first clock signal and the second clock signal over an integer number of clock cycles. The skew error may correspond to a phase difference other than 180° between the first clock signal and the second clock signal.

In some embodiments, the first integrated circuit further includes first control logic to determine at least one value. The value may be determined during a calibration procedure. The first control logic may be included in a feedback loop. The value(s) may be adjusted using the feedback loop after at least a pre-determined time interval since a previous adjustment.

In some embodiments, the value or values are determined in accordance with an error rate over a communications channel that includes at least one integrated circuit. In some embodiments, the value is determined in accordance with an eye pattern. In some embodiments, an adjustment for a duty-cycle error in the first clock signal and the second clock signal is determined in accordance with an asymmetry between a first opening and a second opening in the eye pattern. In some embodiments, an adjustment for a skew error between the first clock signal and the second clock signal is determined in accordance with amplitudes of a first opening and a second opening in the eye pattern.

In some embodiments, the first integrated circuit further includes a plurality of output signal drivers. The respective pair of clock signals of the first plurality of pairs of clock signals may be coupled to a respective output signal driver of the plurality of output signal drivers. The first plurality of adjustment circuits may be proximate to the plurality of output signal drivers. The first plurality of adjustment circuits and the plurality of output signal drivers may be proximate to a first interface to couple the first integrated circuit to at least one other integrated circuit.

In another embodiment, a method includes providing a clock signal; generating a plurality of pairs of clock signals in accordance with the clock signal; reducing duty-cycle and skew errors in the plurality of pairs of clock signals such that duty-cycle and skew errors in a respective pair of clock signals in the plurality of pairs of clock signals are less than corresponding pre-determined values; and providing the plurality of pairs of clock signals to a plurality of pairs of outputs. The respective pair of clock signals includes a first clock signal and a second clock signal. The first clock signal is a complement of the second clock signal. The respective pair of clock signals is provided to a respective pair of outputs in the plurality of pairs of outputs.

In another embodiment, a second integrated circuit includes a second interface to receive at least one clock signal. A second clock distribution circuit is coupled to the second interface and a second plurality of pairs of outputs. The second clock distribution circuit includes a second plurality of adjustment circuits to provide a second plurality of pairs of clock signals in accordance with the clock signal(s). A respective adjustment circuit in the second plurality of adjustment circuits is to provide a respective pair of clock signals in the second plurality of pairs of clock signals to a respective pair of outputs in the second plurality of pairs of outputs. The respective pair of clock signals includes a third clock signal and a fourth clock signal. The third clock signal is a complement of the fourth clock signal and duty-cycle and skew errors in the third clock signal and the fourth clock signal are less than corresponding pre-determined values.

In another embodiment, a system includes the first integrated circuit coupled to the second integrated circuit. The second integrated circuit receives the clock signal(s) from the first integrated circuit.

In some embodiments, the first control logic in the first integrated circuit determines at least one value that is to be stored in at least one register in the respective adjustment circuit in the first integrated circuit. The value(s) may correspond to an adjustment for duty-cycle and/or skew errors in the first clock signal and the second clock signal. In some embodiments, the first control logic is to further determine at least one value that is to be stored in at least one register in the respective adjustment circuit in the second integrated circuit. The value(s) may correspond to an adjustment for duty-cycle and/or skew errors in the third clock signal and the fourth clock signal. In some embodiments, the second integrated circuit further includes a second control logic to determine at least one value that is to be stored in at least one register in the respective second adjustment circuit in the second integrated circuit.

The afore-mentioned integrated circuits reduce and/or eliminate the challenges, such as duty-cycle and/or skew errors, associated with existing clock distribution circuits. Data corresponding to the aforementioned integrated circuits and methods may be stored on a computer readable medium.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A circuit, comprising:
a plurality of output drivers;
a clock generator to provide a clock signal; and
a plurality of adjustment circuits, coupled to the clock generator and to respective output drivers, to generate a plurality of complementary clock signal pairs from the clock signal and to adjust duty-cycle and skew errors in the respective complementary clock signal pairs in accordance with one or more values stored in one or more registers, the complementary clock signal pairs coupled to respective output drivers of the plurality of output drivers.

2. The circuit of claim 1, wherein the one or more registers are configured to store the one or more values as determined during a calibration procedure.

3. The circuit of claim 1, wherein the plurality of adjustment circuits include the one or more registers.

4. The circuit of claim 1, wherein the one or more registers are proximate to the plurality of adjustment circuits.

5. The circuit of claim 1, further comprising control logic to determine the one or more values.

6. The circuit of claim 1, wherein a respective adjustment circuit includes a coarse skew and duty-cycle adjustment circuit to reduce skew and duty-cycle errors in a respective clock signal pair that are greater than a pre-determined value and a fine skew and duty-cycle adjustment circuit to reduce skew and duty-cycle errors in the respective clock signal pair that are less than the pre-determined value.

7. The circuit of claim 6, wherein the one or more registers store a coarse skew and duty-cycle adjustment value for use by the coarse skew and duty-cycle adjustment circuit and a fine skew and duty-cycle adjustment value for use by the fine skew and duty-cycle adjustment circuit.

8. The circuit of claim 1, wherein the plurality of output drivers includes a plurality of pairs of outputs, a respective clock signal pair being provided to a respective pair of outputs in the plurality of pairs of outputs.

9. The circuit of claim 1, wherein a skew error corresponds to a phase difference other than 180° between clock signals in a respective clock signal pair.

* * * * *